United States Patent [19]

Yamada et al.

[11] Patent Number: 5,475,446
[45] Date of Patent: Dec. 12, 1995

[54] PICTURE SIGNAL MOTION DETECTOR EMPLOYING PARTIAL DECIMATION OF PIXEL BLOCKS

[75] Inventors: Masazumi Yamada, Moriguchi; Masakazu Nishino, Kashiwara; Yukio Kurano, Higashiosaka, all of Japan

[73] Assignee: Matsushita Electric Industrial Co., Ltd., Osaka, Japan

[21] Appl. No.: 409,965

[22] Filed: Mar. 24, 1995

Related U.S. Application Data

[63] Continuation of Ser. No. 28,946, Mar. 8, 1993, abandoned.

[30] Foreign Application Priority Data

Mar. 9, 1992 [JP] Japan ................................ 4-050618
Jun. 3, 1992 [JP] Japan ................................ 4-142470

[51] Int. Cl.⁶ .......................... H04N 1/417; H04N 7/32
[52] U.S. Cl. ........................................ 348/699; 348/409
[58] Field of Search ................................ 348/409, 699, 348/410–419; H04N 1/417, 7/32

[56] References Cited

U.S. PATENT DOCUMENTS

| | | | |
|---|---|---|---|
| 4,853,775 | 8/1989 | Rouvrais et al. | 358/105 |
| 5,005,078 | 4/1991 | Gillard | 358/105 X |
| 5,031,039 | 7/1991 | Haghiri et al. | 358/138 |
| 5,072,292 | 12/1991 | Van Overmeire | 358/105 |
| 5,105,271 | 4/1992 | Niihara | 358/133 |
| 5,142,360 | 8/1992 | Niihara | 358/105 |
| 5,144,426 | 9/1992 | Tanaka et al. | 358/133 |
| 5,200,820 | 4/1993 | Gharavi | 358/105 |
| 5,251,030 | 10/1993 | Tanaka | 358/136 |
| 5,262,854 | 11/1993 | Ng | 358/133 |

FOREIGN PATENT DOCUMENTS 02-224490  9/1990  Japan ........................... H04N 7/137

OTHER PUBLICATIONS

CCITT SGVV Working Party XV/4 Document 525(1989) "Description of Ref. Model 8".
"Discrete Cosine Transform Algorithms, Advantages, Applications", by K. R. Rao and P. Yip 1990, pp. 240–255, Academic Press, Inc.

*Primary Examiner*—Victor R. Kostak
*Assistant Examiner*—John W. Miller
*Attorney, Agent, or Firm*—Wenderoth, Lind & Ponack

[57] ABSTRACT

A reference picture signal is stored defining a plurality of image pixels of a reference picture. The input picture signal is divided into a plurality of input block signals each defining a plurality of image pixels of a corresponding input block. Decimation information is set in advance for specifying a portion to be decimated among the plurality of image pixels of each input block. Selected image pixels of each of input blocks are addressed in accordance with the block decimation information to obtain a corresponding decimated input block having an addressed subset of image pixels relative to the plurality of image pixels of each input block. An image motion associated with each input block is estimated by comparing the addressed subset of image pixels of each corresponding decimated input block with the image pixels of the reference image.

14 Claims, 9 Drawing Sheets

○ : pixel employed in matching
× : pixel unemployed in matching

○ : pixel employed in matching
× : pixel unemployed in matching

○ : pixel employed in matching
× : pixel unemployed in matching

PICTURE SIGNAL MOTION DETECTOR EMPLOYING PARTIAL DECIMATION OF PIXEL BLOCKS

This application is a continuation of now abandoned application, Ser. No. 08/028,946, filed Mar. 8, 1993 now abandoned.

BACKGROUND OF THE INVENTION

The present invention generally relates to a motion estimating apparatus to be used in the efficient coding of motion picture signals based on differences between frames.

A so-called block matching algorithm has been employed as one technique for motion estimation. In this technique, each successive picture is divided into small blocks. The motion associated with any particular block is detected by calculating a predicted error between the block in a present picture and each of respective blocks located within a certain interval from the same position of the block in a succeeding picture. The predicted errors of the blocks in the succeeding picture with respect to the block of the present picture are compared. A position of a block in the succeeding picture in which the predicted error is the smallest is deemed to be a motion compensated position with respect to the block of the present picture. The positional difference between the block of the present picture and the motion compensated position is designated a motion vector of the block. A full search method or a tree search method, such as a 3-step method or the like, is employed to obtain the predicted errors. The 3-step searching method is used as a method of reducing the calculating time as compared with the full search method.

The conventional embodiments of a block matching algorithm and a 3-step searching method are described in the publication entitled "Discrete Cosine Transform Algorithms, Advantages, Applications" by K. R. Rao and P. Yip 1990 ACADEMIC PRESS, INC.

In the conventional method, a summation is carried out of the predicted errors of all the pixels within the block, whereby a problem arises in that the number of calculations and hardware scale become larger as the search range is expanded and/or as the size of the motion estimation block becomes larger, thus making it difficult to increase the detection accuracy.

SUMMARY OF THE INVENTION

Accordingly, the present invention has been developed with a view to substantially eliminating the above discussed drawbacks inherent in the prior art and has for its essential object to provide an improved motion estimating apparatus.

Another important object of the present invention is to provide an improved motion estimating apparatus which is capable of avoiding an excessive number of calculations and hardware scale.

In accomplishing these other objects, according to one preferred embodiment of the present invention, there is provided a motion estimating apparatus which effects storing reference picture signals dividing input picture signals into a plurality of blocks, setting in advance decimation interval information for decimating pixels located within the blocks, decimating the pixels located within the above described blocks in accordance with the decimation interval information, and estimating the motion of each of the blocks in accordance with the decimated blocks and the reference picture signal.

By effecting a block matching algorithm with the use of one portion of block pixels while considering the arrangement of the pixels located within the block to be used in the motion vector estimation, the estimation accuracy can be retained with a reduced calculating time and smaller apparatus scale.

Preferably, the hardware scale is further reduced by employing an addressing operation upon pixels located within the block in accordance with the decimating interval or the positional information in the decimating operation of the pixels.

BRIEF DESCRIPTION OF THE DRAWINGS

These and other objects and features of the present invention will become apparent from the following description taken in conjunction with the preferred embodiment thereof with reference to the accompanying drawings, in which.

DETAILED DESCRIPTION OF THE INVENTION

Before the description of the present invention proceeds, it is to be noted that like parts are designated by like reference numerals throughout the accompanying drawings.

Figure 1A:
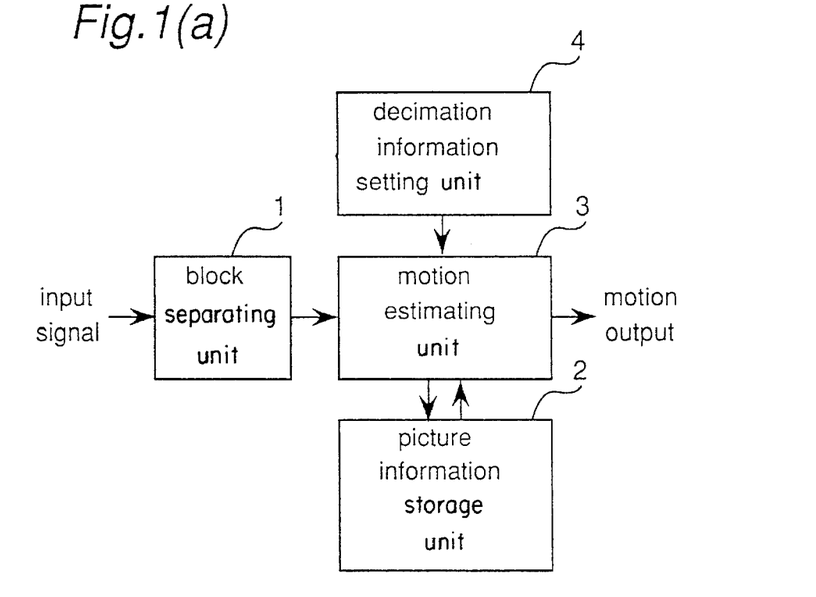
FIG. 1(a) is a block diagram of a motion estimating apparatus in a first embodiment of the present invention.

FIG. 1 is a block diagram for describing a motion estimating apparatus in a first embodiment of the present invention. A block separating unit 1 is for dividing an input picture signal into a plurality of blocks. The block separating unit 1 is connected to a motion estimating unit 3 which estimates the motion of an image within the respective blocks by employing a block matching algorithm in accordance with the picture information of a reference picture stored in a picture information storage unit 2. The motion detecting unit 3 is connected to a decimation information setting unit 4 for setting in advance an interval for decimating pixels.

The operation in the first embodiment will be described below.

Figure 2A:
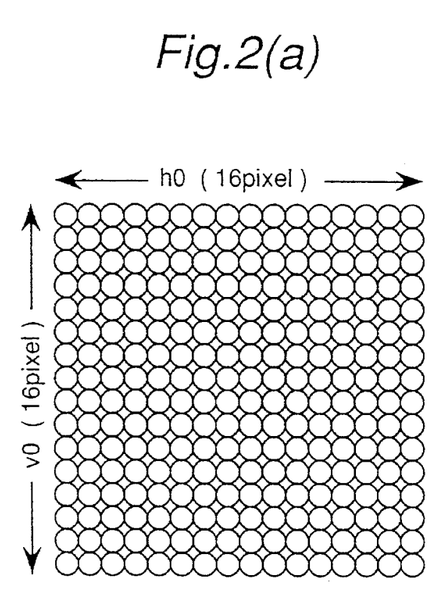
FIG. 2(a) is a view showing an original pixel arrangement located within an estimation block in the first embodiment and a second embodiment of the present invention.

The input picture signal is divided by the block separating unit 1 into a plurality of blocks each having a pixel length v0 and a pixel width h0 as shown in FIG. 2(a).

Figure 2B:
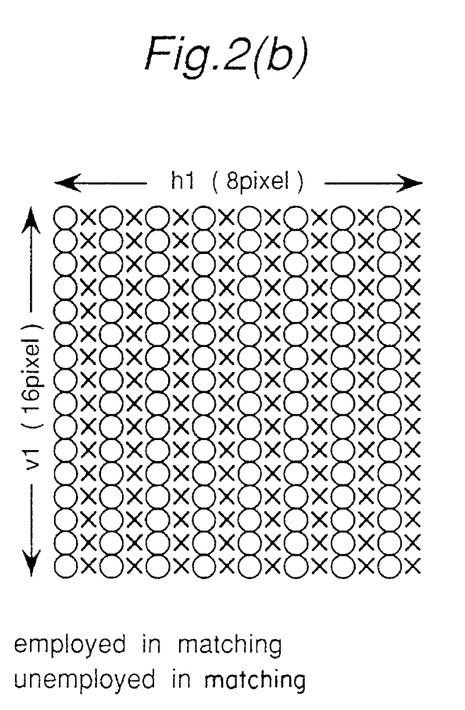
FIG. 2(b) is a view showing one example of decimating pixels located within a block.

Decimation or elimination of pixels within a block is effected by an addressing operation in accordance with decimation interval information set in advance by the decimation information setting unit 4, whereby a partially decimated block having a pixel length v1 and a pixel width h1 is produced as shown in FIG. 2(b). In the motion detecting unit 3, the motion of the block is estimated and outputted by employing a block matching algorithm using, for example, pixel information of an immediately preceding picture provided as a reference picture stored in the picture information storage unit 2 and the partially decimated block which is provided as a unit of estimation. Any one of a full search method and a tree search method, such as a 3-step search method, and so on may be used as the block matching algorithm.

Here, it is assumed that the size of each block generated by the separating unit 1 is 16 by 16 pixels as shown in FIG. 2(a), and that the size of the block after partial decimation and as used in the matching operation is 16 by 8 pixels in accordance with the decimation information setting unit 4 as shown in FIG. 2(b).

Figure 1B:
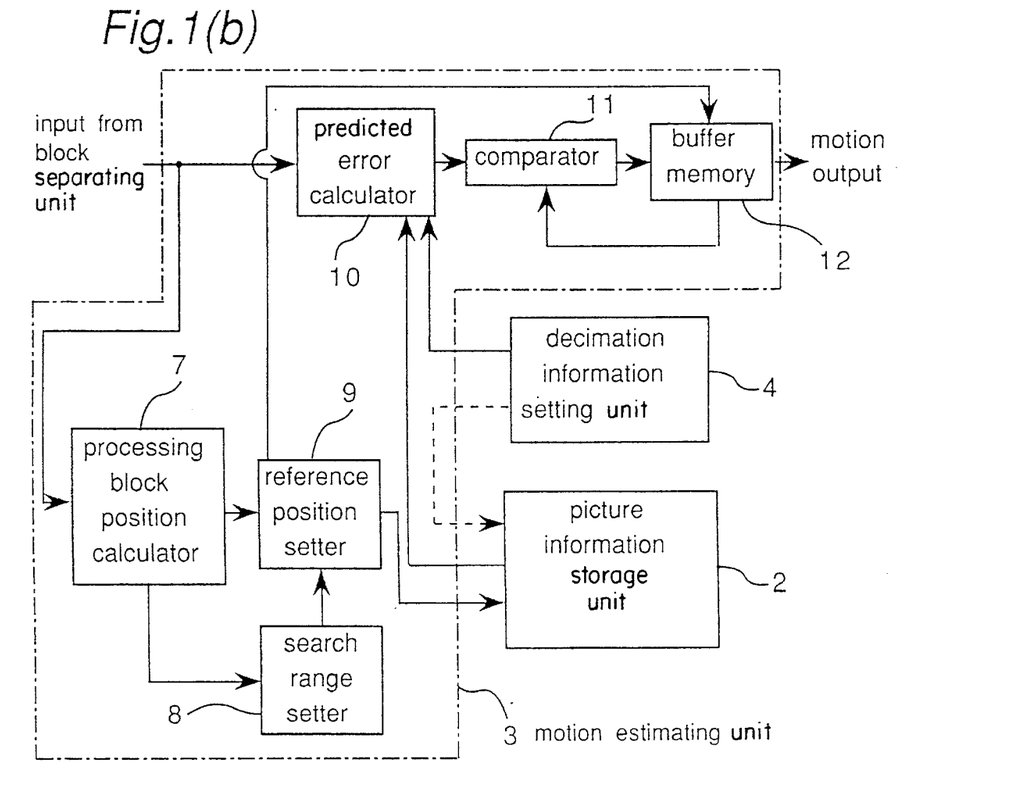
FIG. 1(b) is a block diagram for describing in more detail a motion estimating unit of the motion estimating apparatus in the first embodiment.

The configuration of the motion estimating unit 3 will be described in more detail in connection with an example in which a full search process is effected.

FIG. 1(b) is a block diagram showing a configuration of the motion estimating apparatus for the purpose of explaining the operation of motion estimating unit 3 thereof. In FIG. 1(b), a processing block position calculator 7 is connected to a search range setter 8 for setting a search range within a reference picture plane, and to a reference position setter 9 for setting in succession reference positions to be used during matching.

The reference position setter 9 is connected to the picture information storage unit 2 to set pixel positions to be extracted. The decimation information setting unit 4 is also connected, if necessary, to the picture information storage unit 2. A predicted error calculator 10 is connected to the block separating unit 1 and picture information storage unit 2 to calculate a predicted error with respect to the pixel information of the partially decimated block which has been partially decimated in accordance with the decimation information setting unit 2. A comparator 11 is connected with the predicted error calculator 10 and a buffer memory 12 to renew the content of buffer memory 12 in accordance with a relative size of each predicted error. The buffer memory 12 is also connected with the reference position setter 9 to thereby output the stored content thereof in the final stage of the search operation.

In the configuration described above, a pixel position of the input picture plane within a block is selected, and the selected pixel position is set as a reference position by the reference position setter 9 within the reference picture plane stored in the picture information storage unit 2. Also, within the reference picture plane, a search range from the reference position is set by the search range setter 8.

Figure 4:
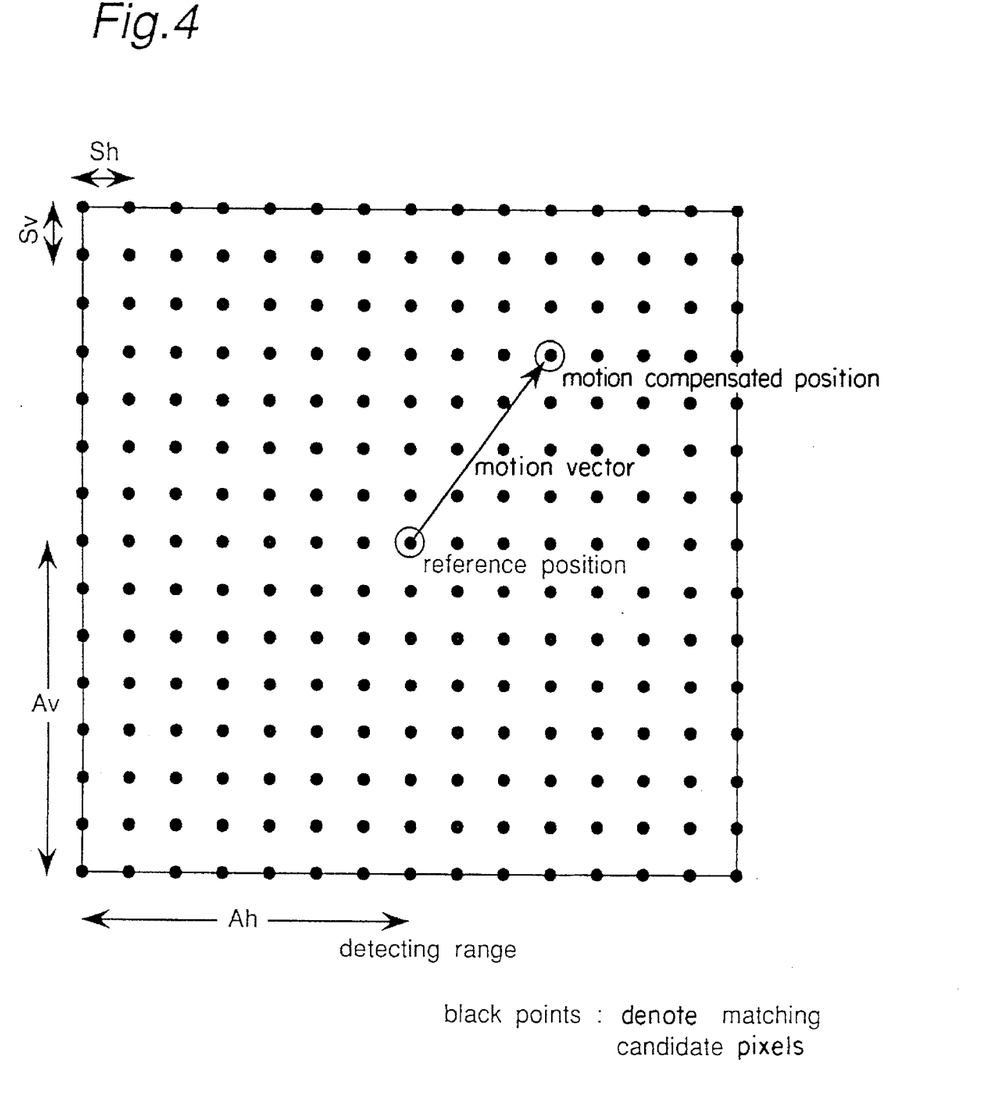
FIG. 4 is a view showing a search range and an interval for search pixels in the first and second embodiments.

Here, as an example shown in FIG. 4, the pixel length Av and pixel width Ah of the search range within the reference picture plane are respectively set at ±7 pixels, and the pixel length Sv and pixel width Sh of pixels intervals of the search are respectively set at ±1 pixel. Using the set pixel intervals Sv, Sh, a search for a minimum predicted error is carried out within the search range set by the search range setter 8.

The reference position setter sets the reference positions in succession by shifting of the reference position by the search pixel interval. Based on the decimation information set in the decimation information setting unit 4 and a reference position set by the reference position setter 9, selected pixels constructing a block are addressed to extract a partially decimated block having a pixel length v1 and pixel width h1 as shown in FIG. 2(b). Here, the size of the block after partial decimation is 16 pixels in length and 8 pixels in width.

A difference between each pixel of the partially decimated block and each corresponding pixel of the reference picture image is calculated, and the sum of absolute values of the differences is calculated as a predicted error by the predicted error calculator 10. The buffer memory 12 temporarily stores the calculated predicted error and the current reference position. The reference position is shifted in succession by the pixel interval of the search by the reference position setter 9, and the search operation (i.e., calculation of a predicted error for each succeeding reference position) continues within the specified search range. A predicted error is calculated each time by the predicted error calculator 10 and compared by the comparator 11 with the predicted error stored in the buffer memory 12. Each time a most recently obtained predicted error of the predicted error calculator 10 is lower than that currently stored in the buffer memory 12, it and its corresponding reference position are made to replace the predicted error and reference position currently stored in the buffer 12.

When the search operation within the specified search range is complete, a reference position associated with a minimum predicted error is designated as a motion compensated position of the block being processed. Also, a motion vector is defined by a magnitude and direction of the positional difference between the reference position and the motion compensated position.

Figure 3A:
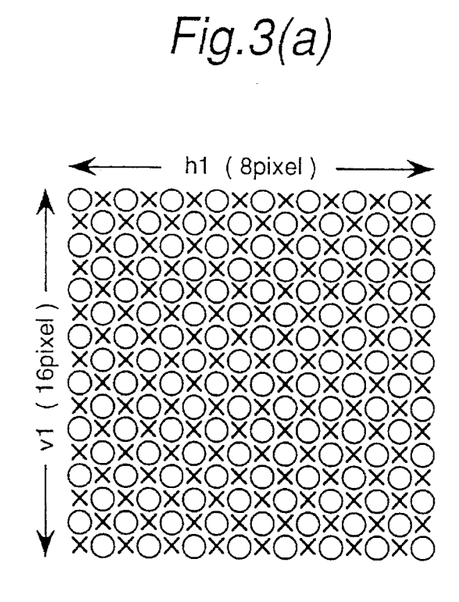
FIGS. 3(a), 3(b) and 3(c) are views showing other examples of the interval of decimating pixels located within a block of the first and second embodiments.
Figure 3B:
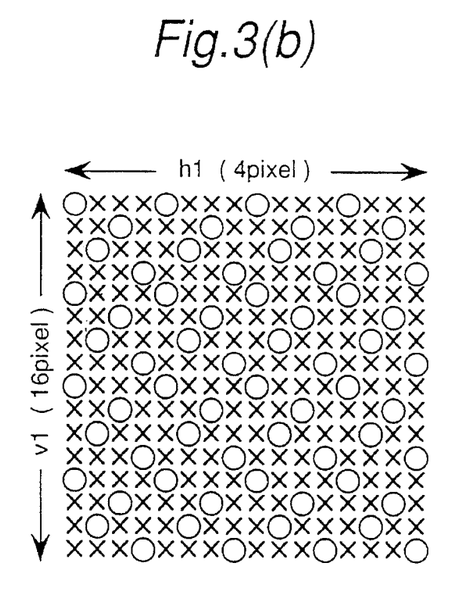
Figure 3C:
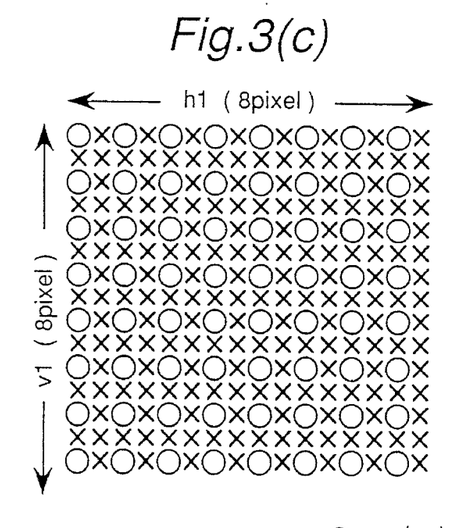

Methods other than that shown in FIG. 2(b) may be adopted to partially decimate the 16 by 16 block of pixels shown in FIG. 2(a). For example, as shown in FIG. 3(a), pixels may be eliminated (not employed) such that after the partial decimation a 16 by 8 pixel block is obtained. Also, as shown in FIG. 3(b), a 16 by 4 pixel block may be obtained, and as shown in FIG. 3(c), an 8 by 8 pixel block may be obtained, and so on. Since the position of eliminated pixels is shifted and offset relative to the upper and lower scanning lines in the methods of FIG. 3(a) and FIG. 3(b), the bandwidth in the horizontal direction after the partial decimation is retained, thus allowing the motion estimation to be effected with higher accuracy.

The motion estimation using in particular the above described partially decimated pixel block is reduced in error if a low-pass filter is not applied, because the bandwidth is previously limited to some degree due to characteristics of a camera and so on, especially with respect to the horizontal direction. Therefore, an increase in the apparatus scale can be avoided without special use of the low-pass filter. To obtain the motion if the apparatus scale is to be increased, restricting the bandwidth with the use of a low-pass filter and so on is effected.

Figure 5A:
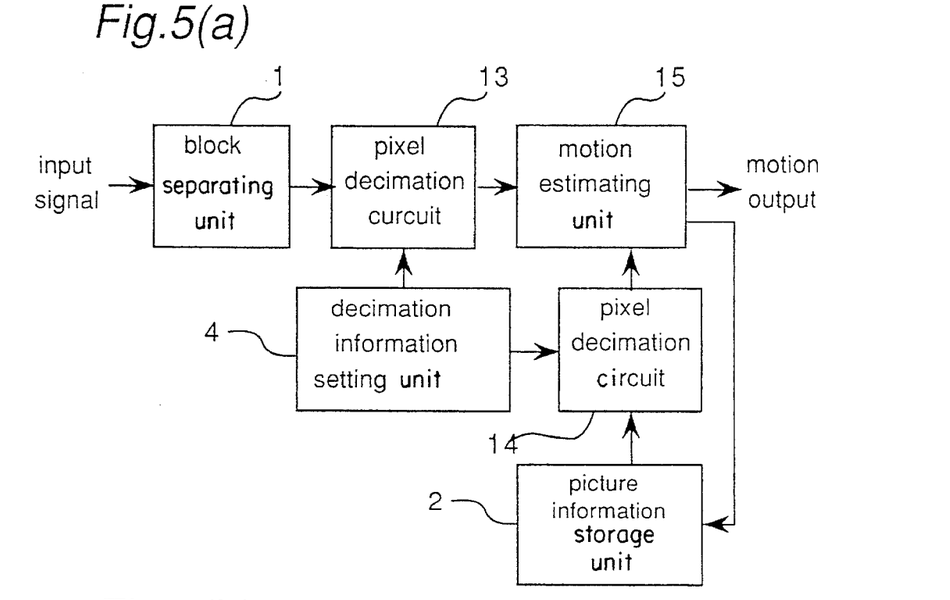
FIG. 5(a) is a block diagram for describing the motion estimating apparatus in the second embodiment.

FIG. 5(a) is a block diagram for describing the motion estimating apparatus in a second embodiment of the present invention. A block separating unit 1 divides an input picture into a plurality of blocks. A picture decimating unit 13 eliminates specified pixels located within each block and is connected to the block separating unit 1. A motion estimating unit 15 estimates the motion in each block by employing a block matching algorithm with respect to a reference picture stored in a picture information storage unit 2 connected to the pixel decimating circuit 14. The motion estimating unit 15 is connected to the outputs of both picture decimating circuits 13, 14. The picture decimating circuits 13, 14 are connected to a decimating information setting unit 4 which sets in advance the pixels to be eliminated in each block. The decimation information setting unit 4 may be connected to the motion estimating unit 15 if necessary.

The operation of the second embodiment will be described below.

The input picture signal is input to the block separating unit apparatus where it is divided into blocks each having a pixel length v0 and a pixel width h0 as shown in FIG. 2(a). Each block is then partially decimated by the pixel decimating circuit 13 with the use of decimating information set by the decimating information setting unit 4 so as to produce a partially decimated block having a pixel length v1 and a pixel width h1 as shown in FIG. 2(b). The picture information storage unit 2 has stored therein a reference picture to be used for block matching, for instance, an immediately preceding picture. The reference picture stored in the picture information storage unit 2 is also partially decimated by the picture decimating circuit 14 to generate blocks of pixels having a pixel length v1 and a pixel width h1 as shown in FIG. 2(b). A low-pass filter is contained in the pixel decimating circuits 13, 14 so as to restrict bandwidth.

In the motion estimating unit 15, the motion of each block is estimated and outputted by employing a block matching algorithm method using the partially decimated blocks of the reference picture and the partially decimated blocks of the input picture. Any one of a full search method and a tree search method such as 3-step search method, and so on may be used as the block matching algorithm.

Figure 5B:
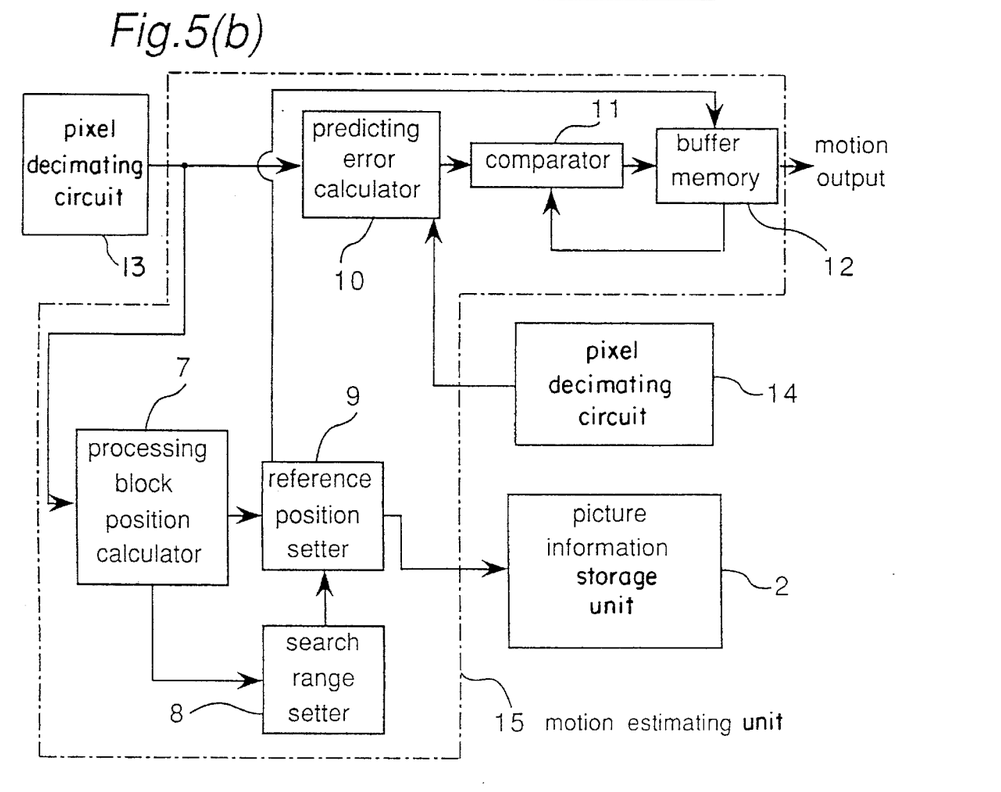
FIG. 5(b) is a block diagram for describing in more detail a motion estimating unit of the motion estimating apparatus in the second embodiment.

The configuration of the motion estimating unit 15 will be described in more detail below in connection with an example of a full search process.

FIG. 5(b) is a block diagram showing the construction of the motion estimating apparatus for explaining in particular the operation of motion estimating unit 15 thereof. In FIG. 5(b), a processing block position calculator 7 is connected to a search range setter 8 for setting a search range within a reference picture plane, and to a reference position setter 9 for setting in succession reference positions to be used in matching.

The reference position setter 9 is connected to the picture information storage unit 2 to set pixel positions to be extracted upon matching. The decimation information setting unit 4 is also connected, if necessary, to the picture information storage unit 2. A predicted error calculator 10 is connected to outputs of the pixel decimating circuits 13 and 14 to calculate a predicted error for each reference position.

A comparator 11 is connected to the predicted error calculator 10 and a buffer memory 12 to renew the predicted error stored in the buffer memory 12 in accordance with the magnitude of the predicted error of each reference position calculated by the calculator 10. The buffer memory 12 is also connected to the reference position setter 9 to receive and store a reference position each time the stored predicted error is renewed.

If low-pass filter, which can be omitted, is built in the pixel decimating circuits 13 and 14 in the second embodiment, several types of low-pass filters may be switched appropriately in accordance with the block to be processed.

In the first and second embodiments, the size of each block before partial decimation may be optionally selected without restriction to 16 by 16 pixel block described above. Also, the size of each block after partial decimation may be optionally selected. However, v1 must be equal to v0 or less, h1 must be equal to h0 or less.

Positional offset of the eliminated pixels upon partial decimation may be carried out in the above described first and second embodiments without restriction to those shown in FIG. 3(a) and FIG. 3(b).

Also, a method of appropriately switching between different offsets in accordance with the input signal may be adopted.

Figure 6A:
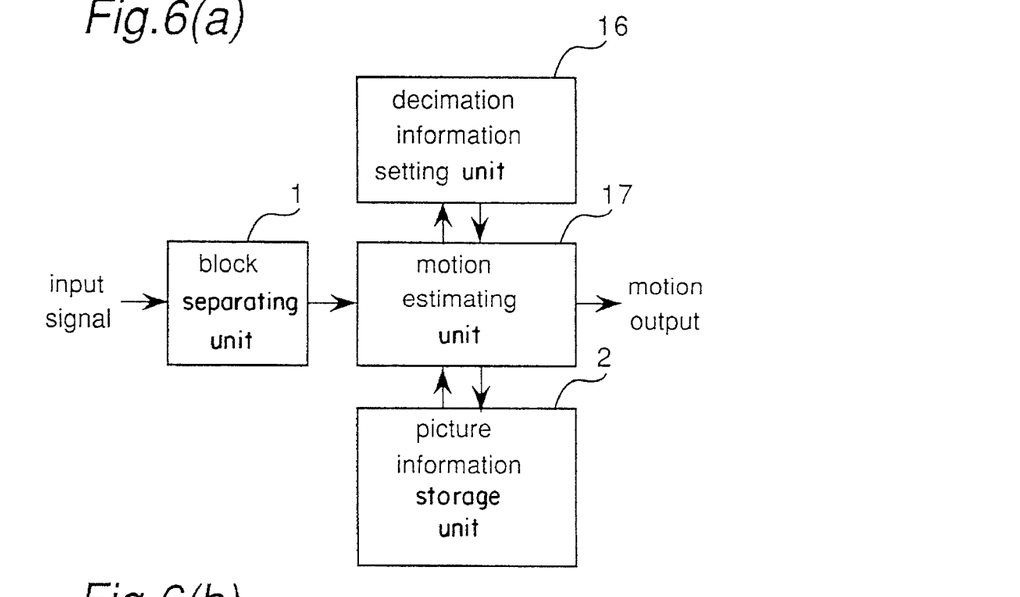
FIG. 6(a) is a block diagram for describing the motion estimating apparatus in a third embodiment of the present invention.

FIG. 6(a) is a block diagram of a motion estimating apparatus for describing a third embodiment of the present invention. A block separating unit 1 divides an input picture into a plurality of blocks. A motion estimating unit 17 detects the motion in each block by employing a block matching algorithm using a reference picture stored in a picture information storage unit 2 and the blocks obtained by the block separating apparatus 1. The motion estimating unit 17 is connected to a decimation information setting unit 16 for setting in advance pixels to be eliminated upon decimation. It is noted that the difference between the decimation information setting unit 16 of FIG. 6(a) and the unit 4 of FIG. 1 resides in the setting of several kinds of decimating intervals in accordance with each of the search steps of the motion estimation.

The operation of the third embodiment will be described below.

The input picture signal is input to the block separating unit 1 and is divided into blocks each having a pixel length v0 and a pixel width h0 as shown in FIG. 2(a). Here, it is assumed that 16 by 16 pixel blocks are obtained. In the motion estimating unit 17, the motion of each block is estimated and outputted by employing a block matching algorithm with respect to the reference picture, for example, an immediately preceding picture, stored in the picture information unit 2, and with the use of the decimation information set by the decimation information setting unit 16.

In the present embodiment, the block matching algorithm is effected using a tree searching method, such as 3-step searching method, or the like.

The motion estimating unit 17 will be described in detail below.

Figure 6B:
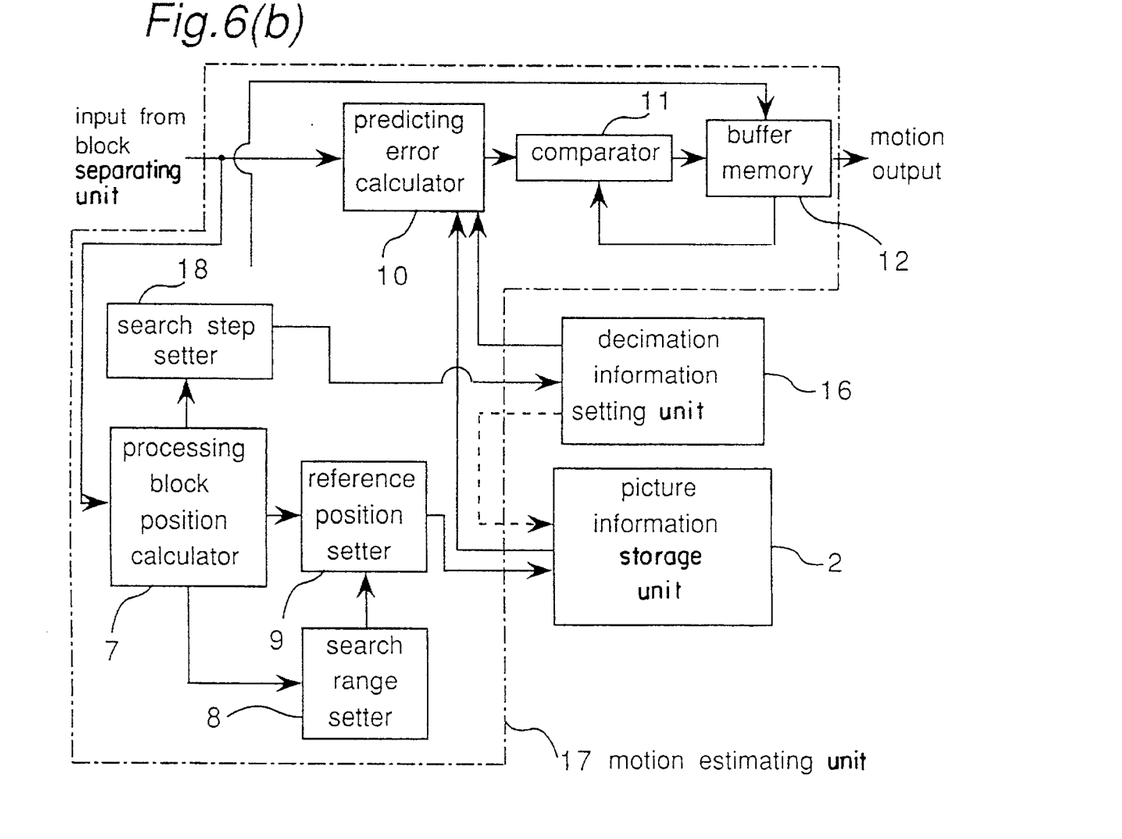
FIG. 6(b) is a block diagram for describing in more detail a motion estimating unit of the motion estimating apparatus in the third embodiment.

FIG. 6(b) is a block diagram for describing the motion estimating unit 17.

Namely, a search step setter 18 is for setting a search step and a search pixel interval, a search range setter 8 is for setting a search range in the reference picture, a reference position setter 9 is for sequentially setting the reference positions to be used in the matching operation. These components are connected to a processing block position calculator 7. A decimation information setting unit 16 is for setting decimation information in accordance with the search step or the search pixel interval set by the search step setter 18. The reference position setter 9 is connected to the picture information storage unit 2 so as to set the output reference pixel position.

The decimation information setting unit 16 is also connected, if necessary, to the picture information accommodating unit 2.

The output from the block separating unit 1 and the output from the picture information 2 are connected to a predicted error calculator 10. The predict error is calculated using pixel information which has been partially decimated in accordance with the decimation information from the decimation information setting unit 16. A comparator 11 is connected with the predicted error calculator 10 and a buffer memory 12 so as to renew the presently stored predicted error of the buffer memory 12 in accordance with a magnitude of each new predicted error. The buffer memory 12 is also connected to the reference position setter 9 so as to update a stored reference position each time the predicted error is renewed.

An example of a 3-step search method is described below.

The search step is initialized as a first search step by the search step setter 18. A position of a block to be processed in the input picture is calculated by the processing block position calculator 7. A position equivalent to the calculated position is set by the reference position setter 9 as the reference position of the reference picture stored in the picture information storage unit 2. The search range is also set using the search range setter 8 together with the reference position, within the stored reference picture.

Figure 7:
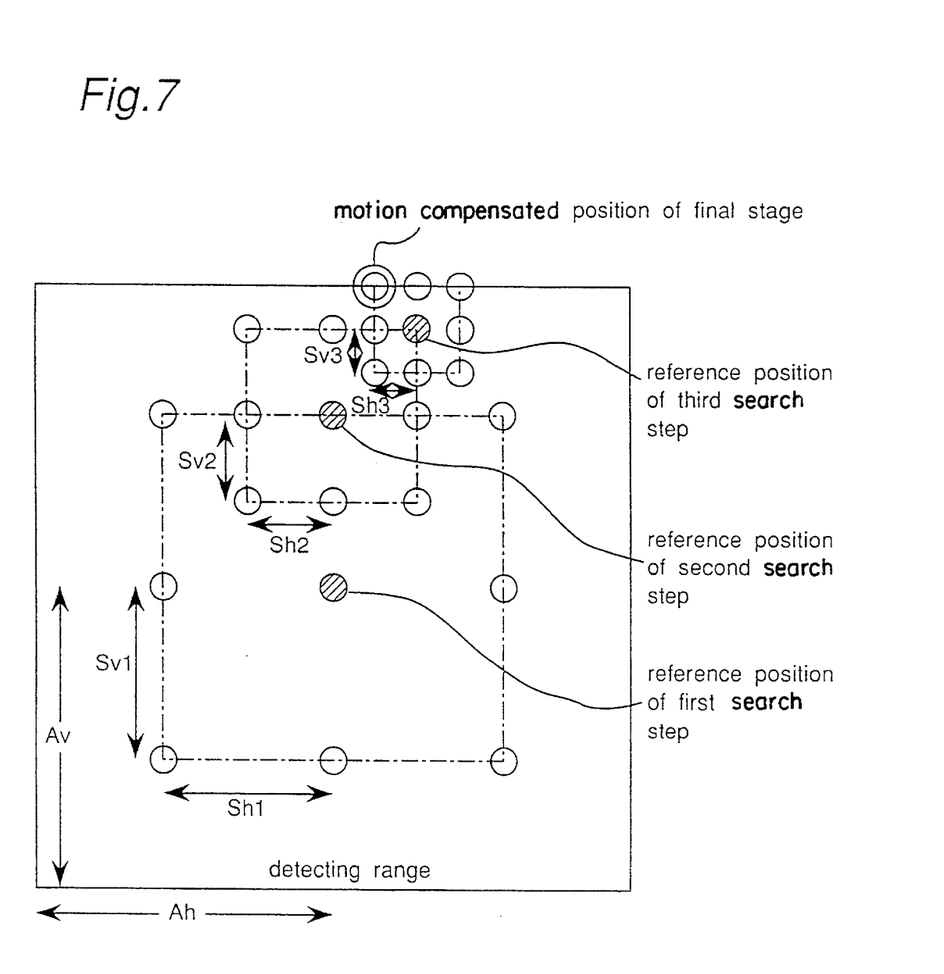
FIG. 7 is a view showing a search range and a search pixel interval in the third embodiment and a fourth embodiment of the present invention.

As shown in the example of FIG. 7, a search range has a pixel length Av of ±7 pixels and a pixel width Ah of ±7 pixels within the reference picture, a search pixel interval of a first search step has a pixel length Sv1 of ±4 pixels and a pixel width Sh1 of ±4 pixels, a search pixel interval of a second search step has a pixel length Sv2 of ±2 pixels and a pixel width Sh2 of ±2 pixels, and a search pixel interval of a third search step has a pixel length Sv3 of ± 1 pixel and a pixel width Sv3 of ±1 pixel.

The search pixel interval in the first search step is set as Sv1 and Sh1 by the search step setter 18. The decimation information in the first search step is set by the decimation information setting unit 16. The search range set by the search range setter 8 is searched in accordance with the search pixel interval of the first step set by the search step setter 18. The reference positions are set in succession by shifting thereof by specified intervals in accordance with the reference position setter 9.

Figure 8A:
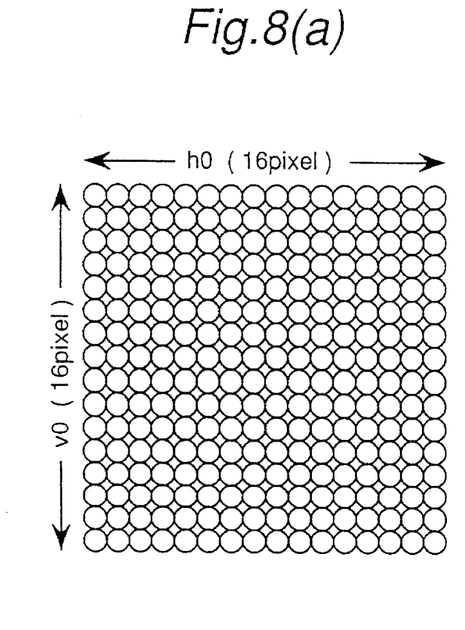
FIG. 8(a) is a diagram showing the original pixel arrangement located within an estimating block in the third and fourth embodiments.
Figure 8B:
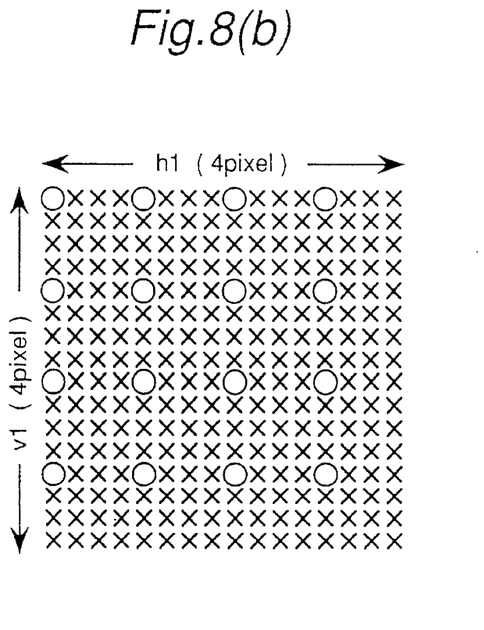
FIGS. 8(b), 8(c) and 8(d) are views showing one example for decimating pixels located within a block in respective search steps.

An addressing operation is applied to the pixels constituting each block to be processed in accordance with the decimation information set in the decimation information setting unit 16 so as to extract a partially decimated v1 by h1 block of pixels as shown in FIG. 8(b). Addressing of pixels in accordance with the decimation information setting unit 16 is effected from the reference position set by the reference position setter 9 so as to extract the block of pixels shown in FIG. 8(b). Here, the block obtained after partial decimation is assumed to be a 4 by 4 pixel block. A sum of absolute pixel value differences is calculated by the predicted error calculator 10 as a predicted error with respect to pixels extracted from the block to be processed and pixels extracted from the reference picture. The calculated predicted error and the reference position at this time are recorded in the buffer memory 12.

The reference positions are set in succession by shifting the position thereof by the pixel interval set by the reference position setter 9 so as to continue the search within the search range. For each reference position, a predicted error is calculated by the predicted error calculator 10 and compared by the comparator 11 with a predicted error currently stored in the buffer memory 12. The predicted error and corresponding reference position stored in the buffer memory 12 are renewed each time a new minimum predicted error is obtained from the predicted error calculator 10. When the search operation of the search range has been completed, the reference position associated with the minimum predicted error is deemed to be the motion compensated position of the block being processed, and a magnitude and direction of a positional difference between original reference position to the motion compensated position defines a motion vector of the first search step.

Figure 8C:
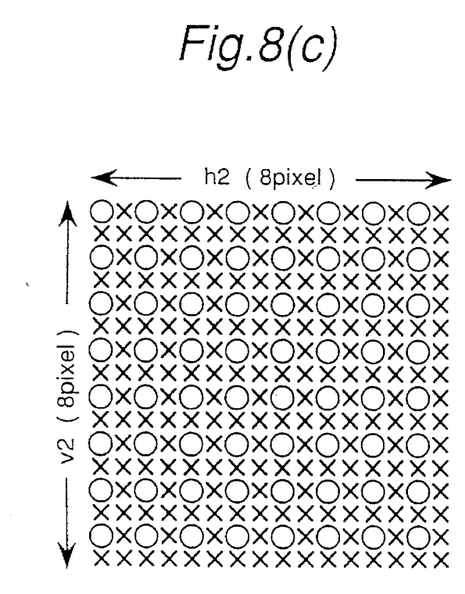

The motion compensated position of the first search step is newly set by the reference position setter 9 as an original reference position of the second search step. The search pixel interval of the second search step from the search step setter 18 is set as Sv2 and Sh2 as shown in FIG. 7. Decimation information of the second search step is set by the decimation information setting unit 16. The search range set by the search range setter 8 is searched within the search pixel interval of the second step set by the search step setter 18 as shown in FIG. 7. Pixels are extracted as shown in FIG. 8(c) from the block being processed and the reference picture in accordance with the decimation information of the second search step in the same manner as the above described first search step. Also in a similar manner, the motion compensated position and the motion vector of the second search step in the block to be processed are obtained and stored in the buffer memory 12.

Figure 8D:
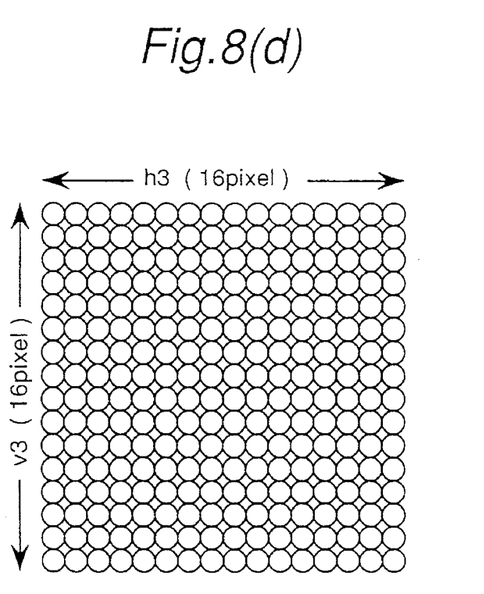

The motion compensated position obtained in the second search step is likewise set in by the reference position setter 9 as the original reference position of the third search step. The search pixel interval of the third search step is set by the search step setter 18 as Sv3 and Sh3 a shown in FIG. 7. The decimation information of the third search step is set by the decimation information setting unit 16. The search range set by the search range setter 8 is searched as shown in FIG. 7 within the search pixel interval of the third search step as set by the search step setter 18. Pixels are extracted as shown in FIG. 8(d) from the block to be processed and the reference picture in accordance with the decimation information of the third search step in the same manner as in the first and second search steps. Also in a similar manner, the motion compensated position and the motion vector of the third search step in the block to be processed are obtained and stored in the buffer memory 12.

The motion vector of the third and final search step is outputted as the motion vector of the block to be processed.

Figure 9A:
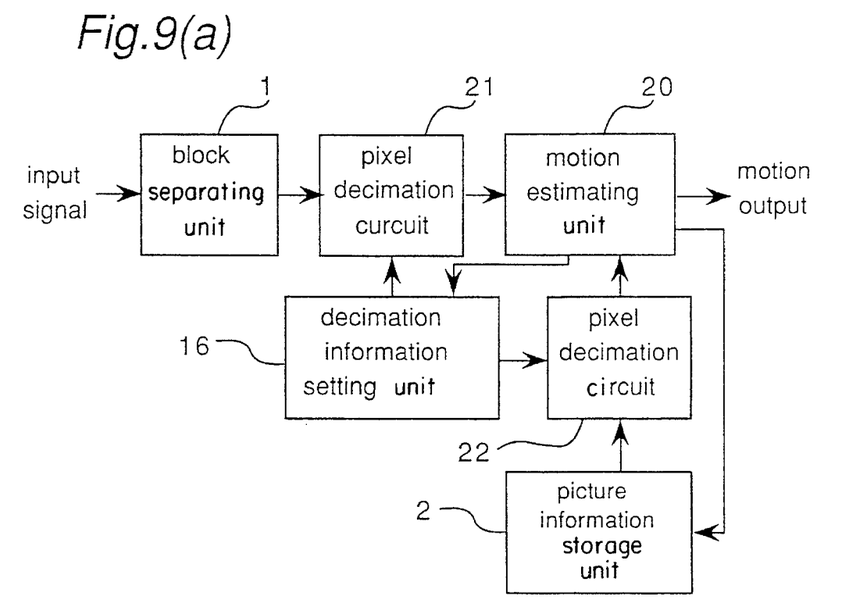
FIG. 9(a) is a block diagram for describing the motion estimating apparatus in the fourth embodiment.

FIG. 9(a) is a block diagram of a motion estimating apparatus for describing a third embodiment of the present invention. Namely, a block separating apparatus 1 is for dividing an input picture signal into a plurality of blocks. A motion estimating unit 20 is for detecting the motion in each block by employing a block matching algorithm using a reference picture stored in a picture information storage unit 2. The motion estimating unit 20 is connected to a decimation information setting unit 16 for setting in advance pixels which are to be decimated or eliminated. The decimation information setting unit 16 is connected to two pixel decimation circuits 21, 22 for respectively decimating pixels of the blocks of the block separating apparatus and pixels of the reference picture stored in the picture information storage unit 2.

The operation of the fourth embodiment will be described below.

The input signal is divided into blocks each having a pixel length v0 and a pixel width h0 as shown in FIG. 2(a) by a block separating apparatus 1. For example, 16 by 16 pixel blocks are obtained. The block signals are decimated by the pixel decimating circuit 21 based on the decimation information set by the decimation information setting unit 16 in accordance with each of the search steps of the motion estimation. The motion of each block is estimated and outputted by employing a block matching algorithm using the partially decimated block and the reference picture, for example, an immediately preceding picture, stored in the picture information storage unit 2, the reference picture also having been partially decimated according to the decimation information.

In the present embodiment, the block matching operation is effected using a tree search method, such as a 3-step search method, or the like.

Signals are extracted from the picture information storage unit 2 to obtain a pixel block of the reference picture each having a pixel length v0 and a pixel width h0. The block is partially decimated by the pixel decimating circuit 22 based on the decimation information set by the decimation information setting unit 16 in accordance with each of the search steps of the motion estimation. The pixel decimation circuits 21,22 are accommodated with a low-pass filter therein to restrict bandwidth. The motion estimating unit 20 is adapted to output a detected movement of the block of the input picture by employing a block matching algorithm.

The motion estimating unit 20 will be described in more detail below.

Figure 9B:
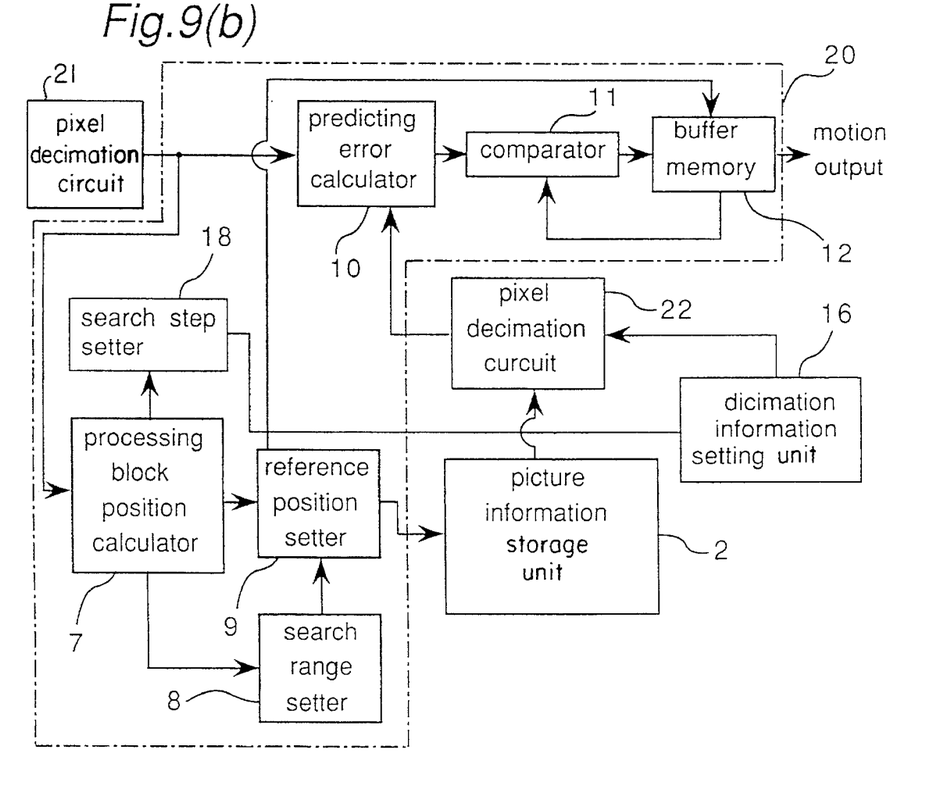
FIG. 9(b) is a block diagram for describing in more detail a motion estimating unit of the motion estimating apparatus in the fourth embodiment.

FIG. 9(b) is a block diagram for describing the motion estimating unit 20.

A search step setter 18 is for setting a search step and a corresponding search pixel interval, a search range setter 8 is for setting a search range within the reference picture, a reference position setter 9 is for sequentially setting reference positions to be used in the matching operation. The components are connected to a processing block position calculator 7. A decimation information setting unit 16 is for setting decimation information in accordance with the search step or the search pixel interval set by the search step setter 18. The reference position setter 9 is connected to the picture information storage unit 2 so as to set the reference picture position to be extracted. The pixel decimating circuits 22, 23 are connected to the decimation information setting unit 16 so as to eliminate specified pixels of the blocks of the input picture and the reference picture. The outputs from the pixel decimating circuits 21, 22 are connected to the predicted error calculator 10 so as to calculate the predicted error using the partially decimated blocks of pixels.

An example of a 3-step search method is described below.

The search step is initialized as a first search step by the search step setter 18. A position of the block to be processed within the input picture is calculated by the processing block position calculator 7.

A position equivalent to the calculated position is set in the reference position setter 9 as the reference position of the reference picture stored in the picture storage unit 2. The search range is also set using the search range setter 8 together with the reference position, within the stored reference picture.

As shown in the example of FIG. 7, a search range has a pixel length Av of ±7 pixels and a pixel width Ah of ±7 pixels within the reference picture, a search pixel interval of a first search step has a pixel length Sv1 of ±4 pixels and a pixel width Sh1 of ±4 pixels, a search pixel interval of a second search step has a pixel length Sv2 of ±2 pixels and a pixel width Sh2 of ±2 pixels, and a search pixel interval of a third search step has a pixel length Sv3 of ±1 pixel and a pixel width Sv3 of ±1 pixel.

The search pixel interval in the first search step is set as Sv1 and Sh1 by the search step setter 18. The decimation information in the first search step is set by the decimation information setting unit 16. The search range set by the search range setter 8 is searched in accordance with the search pixel interval of the first step set by the search step setter 18. The reference positions are set in succession by shifting thereof by specified intervals in accordance with the reference position setter 9.

In accordance with the decimation information set by the decimation information setting unit 16, as shown in FIG. 8(b), the pixel decimating circuits 22 and 23 extract pixels from the blocks of the input picture and from the reference picture to obtain partially decimated blocks each having a pixel length h1 and a pixel width v1. The decimating circuits 22, 23 are optionally provided with low-pass filters therein so as to restrict bandwidth. Also, several types of low-pass filters may be selectively employed in accordance with blocks to be processed. Here, the block obtained after partial decimation is assumed to be a 4 by 4 pixel block. A sum of absolute pixel value differences is calculated by the predicted error calculator 10 as a predicted error with respect to pixels extracted from the block to be processed and pixels extracted from the reference picture. The calculated predicted error and the reference position at this time are recorded in the buffer memory 12.

The reference positions are set in succession by shifting the position thereof by the pixel interval set by the reference position setter 9 so as to continue the search within the search range. For each reference position, a predicted error is calculated by the predicted error calculator 10 and compared by the comparator 11 with a predicted error currently stored in the buffer memory 12. The predicted error and corresponding reference position stored in the buffer memory 12 are renewed each time a new minimum predicted error is obtained from the predicted error calculator 10. When the search operation of the search range has been completed, the reference position associated with the minimum predicted error is deemed to be the motion compensated position of the block being processed, and a magnitude and direction of a positional difference between original reference position to the motion compensated position defines a motion vector of the first search step.

The motion compensated position of the first search step is newly set by the reference position setter 9 as an original reference position of the second search step. The search pixel interval of the second search step from the search step setter 18 is set as Sv2 and Sh2 as shown in FIG. 7. Decimation information of the second search step is set by the decimation information setting unit 16. The search range set by the search range setter 8 is searched within the search pixel interval of the second step set by the search step setter 18 as shown in FIG. 7. Pixels are extracted as shown in FIG. 8(c) from the block being processed and the reference picture in accordance with the decimation information of the second search step in the same manner as the above described first search step. Also in a similar manner, the motion compensated position and the motion vector of the second search step in the block to be processed are obtained and stored in the buffer memory 12.

The motion compensated position obtained in the second search step is likewise set in by the reference position setter 9 as the original reference position of the third search step. The search pixel interval of the third search step is set by the search step setter 18 as Sv3 and Sh3 as shown in FIG. 7. The decimation information of the third search step is set by the decimation information setting unit 16. The search range set by the search range setter 8 is search as shown in FIG. 7 within the search pixel interval of the third search step as set by the search step setter 18. Pixels are extracted as shown in FIG. 8(d) from the block to be processed and the reference picture in accordance with the decimation information of the third search step in the same manner as in the first and second search steps. Also in a similar manner, the motion compensated position and the motion vector of the third search step in the block to be processed are obtained and stored in the buffer memory 12.

The motion vector of the third and final search step is outputted as the motion vector of the block to be processed.

An operations number of s×m×n×2 is required in the estimation of the motion vector of the one block, wherein "s" is the search step number, "m" is the search position number of each stage, and "n" is pixel number per block. 3×m×n×2 is provided in the case of s=3. The number of operations is m×(n1+n2+n3)×2 in the present invention where the number of the pixels to be disposed in the search steps 1, 2, 3 among the pixel number n is respectively n1, n2, n3, where n≧n1, n≧n2, n≧3 due to the partial decimation of each block.

The operation frequency for detecting one motion vector using the above described third and fourth embodiments can therefore be reduced by the time of ((3×n−(n1+n2+n3))×m×2).

In the above described third and fourth embodiments, the search step number is not limited to 3.

Also, the previously described search range length Av and width Ah, and the search pixel intervals Sh1, Sv1 and Sh2, Sv2 and Sh3, Sv3 are not limited to the examples given.

Also, the invention is not limited to the particular pixel arrangement set by the decimation information setting unit 19 as shown in FIG. 8.

The size v0×h0 of each block before the decimation, and the size v1×h1, v2×h2, v3×h3 of each block after partial decimation are not limited to the above examples, although v1, v2, v3 must each be v0 or less, and h1, h2, h3 must each be h0 or less.

A method of obtaining the absolute value sum of the respective differences of the pixels is described above to calculate the predicted errors. However, other methods such as sum of the square errors or the like, may be used instead.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as included therein.

We claim:

1. An apparatus for estimating an image motion of an input picture signal, comprising:

reference picture storage means for storing a reference picture signal defining a plurality of non-decimated image pixels of a reference picture;

block separating means for dividing the input picture signal into a plurality of input block signals each defining a plurality of image pixels of a corresponding input block;

decimation information setting means for setting in advance block decimation information for specifying a portion to be decimated among the plurality of image pixels of each input block; and, motion estimating means for addressing selected image pixels of each input block in accordance with the block decimation information set by said decimation information setting means to obtain a corresponding decimated input block having an addressed subset of image pixels relative to the plurality of image pixels of each input block, and for estimating an image motion associated with each input block by comparing the addressed subset of image pixels of each corresponding decimated input block with the non-decimated image pixels of the reference image as stored in said reference picture storage means.

2. An apparatus as claimed in claim 1, wherein said decimation information setting means sets the block decimation information so as to decimate each vertical row of pixels along a preset horizontal pixel interval of each input block.

3. An apparatus as claimed in claim 1, wherein said decimation information setting means sets the block decimation information so as to decimate a plurality of pixels in every vertical column and horizontal row of each input block.

4. An apparatus for estimating an image motion of an input picture signal, comprising:

block separating means for dividing the input picture signal into a plurality of input block signals each defining a plurality of image pixels of a corresponding input block;

decimation information setting means for setting in advance block decimation information for specifying a portion to be decimated among the plurality of image pixels of each input block;

decimating means for partially decimating each input block in accordance with the block decimation information set by said decimation information setting means to obtain a corresponding decimated input block having a subset of image pixels relative to the plurality of image pixels of each input block;

reference picture storage means for storing a reference picture signal defining a plurality of non-decimated image pixels of a reference picture; and, motion estimating means for estimating an image motion associated with each input block by comparing the addressed subset of image pixels of each corresponding decimated input block with the non-decimated image pixels of the reference image as stored in said reference picture storage means.

5. An apparatus as claimed in claim 4, wherein said decimation information setting means sets the block decimation information so as to decimate each vertical column of pixels along a preset horizontal pixel interval of each input block.

6. An apparatus as claimed in claim 4, wherein said decimation information setting means sets the block decimation information so as to decimate a plurality of pixels in every vertical column and horizontal row of each input block.

7. An apparatus for estimating an image motion of an input picture signal, comprising:

reference picture storage means for storing a reference picture signal defining a plurality of non-decimated image pixels of a reference picture;

block separating means for dividing the input picture signal into a plurality of input block signals each defining a plurality of image pixels of a corresponding input block;

a search range setting means setting a pixel range within the reference picture as stored in the reference picture storage means in accordance with a position of each of the input blocks;

a search position setting means for setting a pixel interval for each of a plurality of successive pixel search processes to be carried out within the pixel range set by said search range setting means;

decimation information setting means for setting in advance, for each of the pixel search processes, block decimation information for specifying a portion to be decimated among the plurality of image pixels of each input block; and, motion estimating means for addressing, during each pixel search process, selected image pixels of each input block in accordance with the block decimation information set by said decimation information setting means to obtain a corresponding decimated input block having an addressed subset of image pixels relative to the plurality of image pixels of each input block, and for estimating, for each pixel search process, an image motion associated with each input block by comparing the addressed subset of image pixels of each corresponding decimated input block with the non-decimated image pixels of the reference image as stored in said reference picture storage means.

8. An apparatus as claimed in claim 7, wherein said decimation information setting means sets the block decimation information of at least one pixel search process so as to decimate each vertical column of pixels along a preset horizontal pixel interval of each input block.

9. An apparatus as claimed in claim 7, wherein a number of pixels decimated in each successive pixel search process is reduced.

10. An apparatus as claimed in claim 7, wherein said decimation information setting means sets the block decimation information of at least one pixel search process so as to decimate a plurality of pixels in every vertical column and horizontal row of each input block.

11. An apparatus for estimating an image motion of an input picture signal, comprising:

block separating means for dividing the input picture signal into a plurality of input block signals each defining a plurality of image pixels of a corresponding input block;

a search range setting means setting a pixel range within the reference picture as stored in the reference picture storage means in accordance with a position of each of the input blocks;

a search position setting means for setting a pixel interval for each of a plurality of successive pixel search processes to be carried out within the pixel range set by said search range setting means;

decimation information setting means for setting in advance, for each of the pixel search processes, block decimation information for specifying a portion to be decimated among the plurality of image pixels of each input block;

decimating means for, during each pixel search process, partial decimating each input block in accordance with the block decimation information set by said decimation information setting means to obtain a corresponding decimated input block having an addressed subset of image pixels relative to the plurality of image pixels of each input block;

reference picture storage means for storing a reference picture signal defining a plurality of non-decimated image pixels of a reference picture; and motion estimating means for estimating, for each pixel search process, an image motion associated with each input block by comparing the addressed subset of image pixels of each corresponding decimated input block with the non-decimated image pixels of the reference image as stored in said reference picture storage means.

12. An apparatus as claimed in claim 11, wherein said decimation information setting means sets the block decimation information of at least one pixel search process so as to decimate each vertical column of pixels along a preset horizontal pixel interval of each input block.

13. An apparatus as claimed in claim 11, wherein a number of pixels decimated in each successive pixel search process is reduced.

14. An apparatus as claimed in claim 11, wherein said decimation information setting means sets the block decimation information of at least one pixel search process so as to decimate a plurality of pixels in every vertical column and horizontal row of each input block.

* * * * *